United States Patent [19]
Finamore

[11] 4,456,019
[45] Jun. 26, 1984

[54] HAIRPIECE AND METHOD OF MAKING SAME
[75] Inventor: Paul V. Finamore, Chicago, Ill.
[73] Assignee: Hairline Creations, Inc., Chicago, Ill.
[21] Appl. No.: 494,695
[22] Filed: May 18, 1983

Related U.S. Application Data
[63] Continuation of Ser. No. 347,622, Feb. 10, 1982, abandoned.
[51] Int. Cl.³ ............................................... A41G 3/00
[52] U.S. Cl. ............................................ 132/5; 132/53
[58] Field of Search .......................................... 132/5

[56] References Cited
U.S. PATENT DOCUMENTS

| 3,037,261 | 6/1962 | Hess | 28/74 |
| 3,342,478 | 9/1967 | Shaw et al. | 132/54 |
| 3,435,831 | 4/1969 | Nakayama et al. | 132/53 |
| 3,520,309 | 7/1970 | Lane et al. | 132/53 |
| 3,645,275 | 2/1972 | Nolen | 132/5 |
| 3,716,065 | 2/1973 | Finamore | 132/53 |
| 3,971,392 | 7/1976 | Brehmer | 132/53 |

Primary Examiner—Gregory E. McNeill
Attorney, Agent, or Firm—Trexler, Bushnell & Fosse, Ltd.

[57] ABSTRACT

The present invention relates generally to a hairpiece, and to a method of making the same, and more particularly, to a hairpiece having a thin, flexible, transparent sheet member vacuum formed from thermo-setting plastic film, with hair strands extending through the sheet member and from the outer surface thereof. The embodiment of the invention disclosed herein includes a low-viscosity penetrating, anaerobic adhesive applied to the hair strands during their extent through the sheet member to secure the hair strands in place, and further includes a removable smooth transparent plastic coating on the undersurface of the sheet member.

3 Claims, 8 Drawing Figures

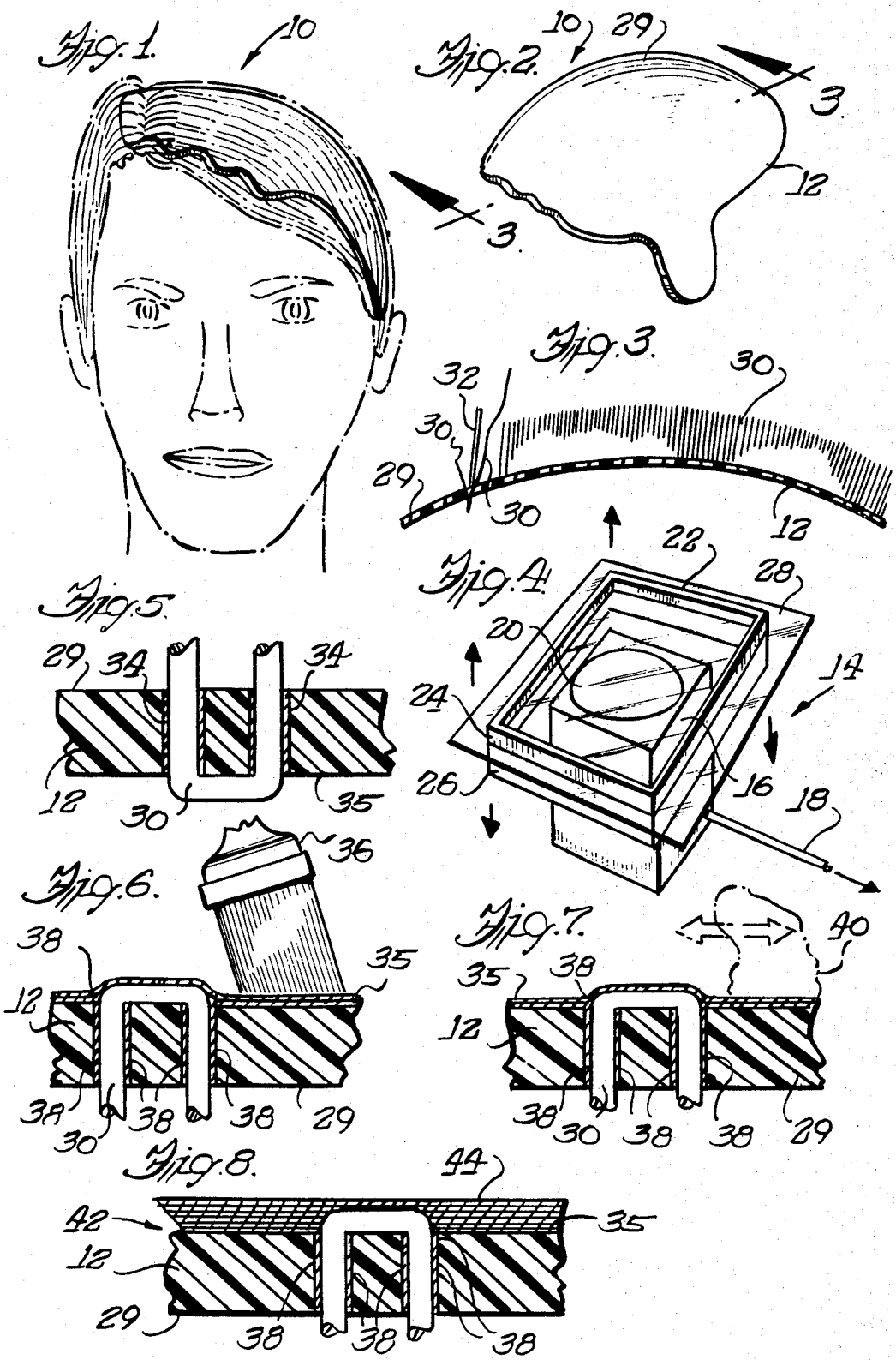

HAIRPIECE AND METHOD OF MAKING SAME

This application is a continuation of application Ser. No. 347,622, filed 2/10/82, now abandoned.

This invention relates to a method and structure for hairpieces, and more particularly, to a hairpiece having an extremely thin base, custom-shaped to fit the exact configuration of the area to be covered and having a construction which completely eliminates raised elements of any type at the edge of the base so that the hairpiece merges, as much as possible, with the natural hair of the user.

Heretofore, hairpieces have been constructed according to methods which result in the manufacture of products which either have an unnaturally thick base or, if the base is relatively thin, which are too delicate to survive the rigors of normal use. For example, hairpieces have been made by coating a mold with a plastisol, which is air-cured to form a skin-colored foundation, through which hair strands are placed. This foundation has been stitched to a strengthening net or gauze; and often, additional layers have been sewn to the foundation to ensure the resistance of the hairpiece to body oils, shampooing or other incidents of normal use. It has also been a common practice, in some instances, to employ binding tape or ribbon along the margin of the hairpiece, which may detract from the natural appearance thereof.

Other constructions have included a silk net or membrane covered with a two-component, chemically-cured, transparent polyurethane coating or a woven membrane having a flesh-colored polyvinyl material in the area where the hair is to be parted. In many of these hairpieces, the objectives of thinness, transparency and strength cannot be met. In order to have adequate tear strength in the foundation material heretofore used, the plastic coatings have been made so thick that the desired transparency feature is easily lost. Also, the soft and permeable plastic foundations, which result from easily molded and cured liquid components, quickly lose strength and transparency when exposed to body oils and perspiration, through normal use.

In addition, in order to conceal the obtrusive foundations heretofore employed, many current hairpieces necessarily have hair that is unnaturally thick to provide an adequate cover for the base and margin of the hairpiece; and this excessive amount of hair may contribute substantially to an unnatural look of the hairpiece when worn.

In accordance with the present invention, an extremely thin, flexible and transparent foundation is employed which need not have any marginal hem or other border structure so that the hairpiece merges as much as possible with the natural hair of the user. Since it is not necessary to take extraordinary measures to conceal the foundation and the edge of the hairpiece, the hair may be used with a more natural fullness or, in some instances, a more natural thinness. Hair strands are secured, as they extend through the foundation, by a penetrating adhesive having an extremely low viscosity. A relatively thin plastic coating is applied to the inner surface of the hairpiece to provide a smooth layer next to the user's head. This coating is sufficiently thin that the transparency of the foundation is unaffected, and the natural appearance of the user's scalp remains visible.

The foregoing, and other advantages, will be more apparent from the following detailed description when considered in connection with the accompanying drawings wherein:

FIG. 1 is a perspective view of a hairpiece of the type contemplated by the present invention;

FIG. 2 is a perspective view of the sheet member of the hairpiece shown in FIG. 1;

FIG. 3 is a sectional view of the sheet member of FIG. 2, the view taken substantially along the line 3—3 of FIG. 2, presenting a manner of attachment of hair to the sheet member;

FIG. 4 is a perspective view illustrating the method of vacuum forming the thin, flexible sheet member shown in FIG. 2;

FIG. 5 is an enlarged sectional view of a pair of hair strand sections showing the manner in which the strands are inserted through the supporting sheet member, the sheet member here being presented on an enlarged scale;

FIGS. 6, 7 and 8 are enlarged sectional views showing the manner in which the adhesive and coatings are applied to the inner surface of the sheet member.

Referring now to the drawings more in detail, it will be seen that a hairpiece, which is representative of one embodiment of the present invention, is designated generally by the numeral 10. The hairpiece 10 includes a sheet member 12 formed, in a manner hereinafter described, of a polyester-based, thermoplastic polyurethane film.

The film is preferably of a type cured under extreme pressure and temperature to yield a high tensile and tear strength, and which is unaffected by body moisture and oils. One such film which is commercially available and has proven successful in the practice of the present invention is Tuftane TF-310 (T.M., B. F. Goodrich General Products Company). Tuftane TF-310 has a specific gravity of 1.21 (ASTM D 792-66); a tear strength of 500 lbs./in. (1.0 mil film ASTM D 1938-62T TD); and a tensile strength of 9,000 psi, modulus at 100% elongation of 3,000 psi, and an elongation at break of 200% (1.0 mil film ASTM D 882–61T MD).

In preparing the sheet member 12 it is first necessary to employ a mold which conforms accurately to the contour of that area of the user's head which is to be covered by the hairpiece 10; and the peripheral dimension of the sheet member 12 must conform to the size of that area. This is accomplished by first making a female mold of the area to be covered, using an appropriate molding material. Materials which have proven successful in the practice of the present invention are the low-temperature thermoplastic materials commonly used as dental impression compounds, which soften at about 120° F. but set rapidly at body temperature. This compound is softened and then applied to the moistened hair and scalp of the user, whereupon it sets in about ten minutes.

Thereafter, a hemispheric, plaster male mold is cast so as to include, at least in part, a portion identical in section and contour to the area of the user's head which is to be covered by the hairpiece 10. After the plaster mold has hardened, it is used as the mold in the vacuum forming process hereinafter described.

FIG. 4 shows a figurative representation of an apparatus 14 known in the art and used to vacuum form plastic sheets. The apparatus 14 includes an air-permeable platform 16 through which air is drawn, via a vacuum channel 18, by a vacuum pump or exhaust means, not shown. A plaster mold 20, produced in the manner hereinbefore described, is placed on the platform 16. The apparatus 14 also includes a frame 22 slidably disposed above the platform 16 and having an upper portion 24 and a lower portion 26 disposed to hold a plastic sheet 28 therebetween. The sheet 28 is first heated until it is formable by a heater, not shown, positioned over the frame 22; and then the frame 22 is lowered over the platform 16 and plaster mold 20 with the decreased air pressure thereabout causing the sheet 28 to be drawn into close mating contact with the mold 20.

According to the practice of the present invention, after the plaster mold 20 is formed and placed on the apparatus 14, a polyethylene thermoplastic sheet is first vacuum formed over the plaster mold 20 to provide a template. The template is then positioned on the user's head to ensure that the template fits precisely. With the template on the head of the user, the outline of the area to be covered by the hairpiece 10 is drawn on the template and is subsequently cut to conform precisely to the area of the user's head.

A working shell made from a heavier sheet of transparent, polypropylene plastic material is also formed on the mold 20. This shell is used primarily as a form or support for the hairpiece 10 during the insertion of the hair into the base. The finished template is placed on the inner surface of the transparent working shell, and the outline of the template is traced on the inside of the shell. This provides the boundaries of the area to be covered during the construction of the hairpiece 10. When the construction is sufficiently completed, this outline is used when cutting the sheet member 12 to its final shape.

Thereafter, a polyester-based, thermoplastic polyurethane film, hereinbefore described, is placed in the frame 22. Preferably, Tuftane TF-310 film having a thickness of 10 mils is used, and is vacuum molded at a temperature of 375°-400° F.

After the sheet member 12 has cooled and set, an outer surface 29 of the sheet member 12 is wiped with dimethylformamide (DMF), or other suitable solvent. The solvent removes gloss from the surface 29; the gloss would otherwise detract from the transparency of the sheet member 12. Thereafter, the surface 29 is rubbed with a drying powder, such as talcum powder, to absorb the remaining solvent and to further dull any gloss remaining thereon.

As is shown in FIG. 3, strands of hair 30 are then applied through the sheet 12 by the use of a needle 32 in a manner which is known in the art. In the areas where it is desired to part the hair when the hairpiece 10 is subsequently worn and combed, the hair 30 is inserted one strand at a time and looped through the sheet member 12 so that each individual strand of hair actually represents two end pieces extending outwardly from the base of the sheet member 12 as shown in FIG. 5. All of the hair 30 may be inserted in this manner; and portions of the hair 30, generally toward the margin of the base and away from the part area, may be inserted in groups of three or four at a time, and tied to the base.

As is shown in FIGS. 3 and 5, the hair 30 may be inserted into the sheet member 12 by a needle 32. The needle 32 forms an aperture 34 in the sheet member 12 the aperture 34 is slightly larger in diameter than the diameter of the hair 30. After all of the hair 30 has been assembled in this manner, a thin layer of flexible, adhesive material 38 having an extremely low viscosity is applied to an underside 35 of the sheet member 12, using a brush 36 as shown in FIG. 6. The thin viscosity of the adhesive 38 is extremely important so that the adhesive 35 may penetrate by capillary action into the microspaces between the hair 30 and the walls of the aperture 34 through the sheet member 12. The preferred adhesive material 38 is also anaerobic; i.e., it is capable of curing in the microspaces in the absence of air. In this embodiment, the adhesive material 38 used is ethyl or methyl cyanoacrylate, preferably ethyl cyanoacrylate as this adhesive 38 has a lower viscosity, and is allowed to cure at room temperature for at least two hours.

After the adhesive 38 has been applied and cured, the undersurface of the sheet member 12 is wiped with a solvent to activate the surface of the adhesive 38. The preferred solvent is a mixture of 60% dimethylformamide and 40% toluene, applied by a cloth 40 as is shown in FIG. 7. This step prepares the undersurface of the sheet member 12 for lining in a manner hereinafter described.

When the hair 30 is applied to the sheet 12 in the manner shown by FIG. 3, each time the needle 32 is pushed through, the undersurface and underside 35 of the sheet 12 is roughened. In addition, the hair 30 also provides a texture, as does the adhesive material 38, as shown more clearly in FIG. 6. This rough or textured surface could possibly irritate the scalp of a wearer if left exposed. In accordance with the present invention, the undersurface of the sheet 12 is lined with a smooth plastic coating 42 (FIG. 8), the coating 42 being sufficiently thin to appear substantially transparent, and being curable at a low temperature to avoid heat damage to the inserted hair 30 (FIGS. 3, 5–8). In a preferred embodiment, this coating 42 comprises a plurality of layers of a liquid, one-part polyester-based, aliphatic polyurethane system sold under the trademark Rucothane (832L) (T. M. Hooker Chemical Company). This polyurethane is carried in a DMF solvent, and has the required property of resistance to yellowing when exposed to air, perspiration and body oils. The layers may be brushed on the undersurface in a manner similar to that shown in FIG. 6, but may also be applied with an artist's palette knife so as to provide a very thin, smooth coating. Each layer is baked in a circulating hot-air oven for one hour at a temperature of 150° F., after application.

As is shown in FIG. 8, it has been found that four layers of the coating 42 will provide an adequate cover, the four layers comprising an overall thickness of less than about 5 mils. It has also been found that a single, thick coating is generally not desirable, since it may tend to peel and cannot be applied as uniformly as to thickness, so that the final hairpiece 10 may not conform precisely to the shape of the user's head.

Finally, a drying powder such as talcum powder is dusted on the inner surface 44 of the finished hairpiece 10 to absorb any remaining solvent from the coating 42. The use of the drying powder facilitates subsequent removal and replacement of transparent double-sided tape strips, which the user applies to the hairpiece 10 to secure it to the head during use.

It is to be noted, that the polyurethane coating 42 may be removed at a later date by the application of a suitable solvent such as DMF (dimethylformamide) to enable the hairpiece 10 to be repaired, to remove hair 30, or to insert more hair 30 or hair of a different color, such as gray, to enhance the natural look.

The invention is claimed as follows:

1. A method for making a disassemblable hairpiece comprising: preforming a thin, flexible sheet member of polyester-based thermoplastic polyurethane film to have a predetermined contour; cutting said sheet member to have peripheral dimensions conforming substantially to a predetermined surface of a head of a user, said sheet member including inner and outer surfaces; forming a plurality of apertures through the sheet member at adjacent positions; inserting at least one strand of hair through each of said apertures, said hair extending from the outer surface of said sheet member so as to afford in the aggregate the appearance of natural hair, each aperture and at least one strand inserted therein defining at least one microscopic space therebetween; permeating said microscopic spaces with a low-viscosity, penetrating anaerobic cyanoacrylate adhesive to secure the hair strands in place; curing said adhesive; applying a solvent to the surface of the cured adhesive to activate said surface; applying at least one removable layer of a polyester-based, aliphatic polyurethane to the inner surface of the sheet member; and curing the layer at room temperature for at least 2 hours thereby forming a smooth coating on said inner surface, the coating being sufficiently thin to appear substantially transparent, said coating initially being irremovably bonded to said sheet member, and subsequently solvent removing the coating and the adhesive from said sheet member by application thereto of an effective amount of a solvent.

2. The method according to claim 1, wherein the sheet member has a thickness of about 10 mils.

3. The method according to claim 2, wherein the coating on the inner surface of the sheet member comprises a plurality of said layers and has a thickness of less than about 5 mils, each said layer having been cured at room temperature for about 2 hours.

* * * * *